United States Patent
Kim

(10) Patent No.: US 9,329,718 B2
(45) Date of Patent: May 3, 2016

(54) DISPLAY DEVICE WITH INPUT SYSTEM AND METHOD FOR DRIVING THE SAME

(71) Applicant: LG DISPLAY CO., LTD., Seoul (KR)

(72) Inventor: Kyounghwan Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 206 days.

(21) Appl. No.: 13/728,047

(22) Filed: Dec. 27, 2012

(65) Prior Publication Data

US 2014/0002413 A1    Jan. 2, 2014

(30) Foreign Application Priority Data

Jun. 29, 2012 (KR) .................... 10-2012-0070568

(51) Int. Cl.
*G06F 3/041* (2006.01)
*G06F 3/044* (2006.01)
*G06F 3/046* (2006.01)

(52) U.S. Cl.
CPC .............. *G06F 3/0416* (2013.01); *G06F 3/044* (2013.01); *G06F 3/046* (2013.01)

(58) Field of Classification Search
None
See application file for complete search history.

(56) References Cited

U.S. PATENT DOCUMENTS

| | | | |
|---|---|---|---|
| 6,043,810 A | 3/2000 | Kim et al. | |
| 7,084,933 B2 * | 8/2006 | Oh et al. | .......... 349/12 |
| 8,395,598 B2 * | 3/2013 | Oda et al. | .......... 345/174 |
| 2009/0267905 A1 | 10/2009 | Hsu et al. | |
| 2011/0227588 A1 | 9/2011 | Chen et al. | |
| 2011/0298748 A1 | 12/2011 | Chen et al. | |
| 2013/0155005 A1 * | 6/2013 | Liang | .......... 345/174 |

FOREIGN PATENT DOCUMENTS

| | | | |
|---|---|---|---|
| CN | 1501317 A | 6/2004 | |
| CN | 102193673 A | 9/2011 | |
| KR | 10-0262725 B1 | 8/2000 | |
| KR | 2011-0057385 A | 6/2011 | |
| KR | 1020110057385 | * 6/2011 | .......... G06F 3/041 |
| KR | 10-2011-0105082 A | 9/2011 | |
| KR | 10-1209514 B1 | 12/2012 | |

OTHER PUBLICATIONS

Chinese Office Action dated Nov. 30, 2015, in Chinese Patent Application No. 201210587631.9.

* cited by examiner

*Primary Examiner* — Jason Olson
*Assistant Examiner* — Deeprose Subedi
(74) *Attorney, Agent, or Firm* — Morgan, Lewis & Bockius LLP

(57) ABSTRACT

A display device with an input system and a method of driving the same are provided. The method for driving a display device with an input system includes: receiving touch information, including electromagnetic touch information or capacitive touch information, by alternately performing electromagnetic touch sensing and capacitive touch sensing, if the touch information is the electromagnetic touch information: performing the electromagnetic touch sensing for a first period, and performing the capacitive touch sensing after the first period, and if the touch information is the capacitive touch information, performing the capacitive touch sensing for the first period.

16 Claims, 6 Drawing Sheets

Electromagnetic Touch Sensing

Capacitive Touch Sensing

Capacitive Touch Sensing

DISPLAY DEVICE WITH INPUT SYSTEM AND METHOD FOR DRIVING THE SAME

CROSS REFERENCE TO RELATED APPLICATION(S)

This application claims the benefit under 35 U.S.C. §119(a) of Korean Patent Application No. 10-2012-0070568, filed on Jun. 29, 2012, in the Korean Intellectual Property Office, the entire disclosure of which is incorporated by reference herein for all purposes.

BACKGROUND

1. Technical Field

The following description relates to a display device, and more particularly, to a display device with an input system.

2. Discussion of the Related Art

Various kinds of input devices may be used for electronic systems, for example, computers such as a laptop computer, a tablet computer, and a personal digital computer; and communication devices such as a mobile phone, and a handheld communication device.

Among the various kinds of input devices, a capacitive touch panel is used widely, which is an input device capable of determining a location of touch by sensing a change of capacitance between a contact surface of the input device and a part of human body being in contact with the input device, for example, a finger or palm.

Also, there is another input device of a digitizer or a tablet PC, which determines a location of touch through the use of indicator, for example, imaging device such as stylus or pen-shaped object.

Generally, in comparison to the capacitive touch panel, the digitizer has better precision in detecting a location of touch, and greater resolution, however, the digitizer is disadvantageous in that it inevitably requires an indicator (for example, stylus or other pen). Thus, there has been a strong desire to combine the advantages of capacitive touch panel (for example, convenience) with the good precision and resolution of the digitizer.

Hereinafter, a display device with an input system, which is capable of using the finger and pen according to the related art, will be described with reference to FIG. 1.

FIG. 1 illustrates problems that may occur in a display device with an input system according to the related art. In particular, FIG. 1 illustrates problems that may occur in a capacitive touch sensing panel and an electromagnetic touch sensing panel.

As shown in FIG. 1, the display device with an input system according to the related art includes a capacitive touch panel 10 and an electromagnetic touch panel 20.

For touch sensing using the capacitive touch panel 10, a change of capacitance is measured by comparing a capacitance after touching the device with a capacitance before touching the device, to thereby determine whether or not the display device is touched, and determine the coordinates of a touched portion. When measuring the change of capacitance in the coordinates of the touched portion of the capacitive touch panel 10 provided with a plurality of sensing electrodes, the capacitive touch panel 10 is exposed to display noise for a considerable period of time, which might cause deterioration in the touch function.

For touch sensing using the electromagnetic touch panel 20, an induced current flows in the electromagnetic touch panel 20 through the use of a pointing device such as stylus or pen, to thereby determine whether or not the display device is touched, and determine the coordinates of a touched portion. If the electromagnetic touch sensing is performed for a period of the capacitive touch sensing, noise caused by the pointing device, such as a stylus or pen, may flow toward the capacitive touch panel 10, whereby a malfunction may occur in the capacitive touch sensing.

Although not shown in FIG. 1, both drivers for driving the capacitive touch panel 10 and electromagnetic touch panel 20 may be simultaneously driven in the display device with an input system according to the related art, whereby power consumption may be increased.

Therefore, the display device with an input system according to the related art has the following disadvantages.

If the electromagnetic touch sensing is performed for the period of capacitive touch sensing, noise occurring in the electromagnetic touch panel 20 may flow toward the capacitive touch panel 10, whereby a malfunction may occur in the capacitive touch sensing.

Also, both drivers for driving the capacitive touch panel 10 and electromagnetic touch panel 20 may be simultaneously driven in the display device with an input system according to the related art, whereby power consumption may be increased.

SUMMARY

Embodiments of the present invention relate to a display device with input system and method for driving the same. Accordingly, embodiments of the present invention are directed to a display device with an input system that substantially obviates one or more problems due to limitations and disadvantages of the related art.

An object of embodiments is to provide a display device with an input system which facilitates to overcome a touch malfunction caused by noise flowing into a capacitive touch panel.

Advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose according to one aspect of the invention, there is provided a method for driving a display device with an input system, including: receiving touch information, including electromagnetic touch information or capacitive touch information, by alternately performing electromagnetic touch sensing and capacitive touch sensing, if the touch information is the electromagnetic touch information: performing the electromagnetic touch sensing for a first period, and performing the capacitive touch sensing after the first period, and if the touch information is the capacitive touch information, performing the capacitive touch sensing for the first period.

In another aspect, there is provided a display device with an input system including: an idle sensor configured to alternately perform electromagnetic touch sensing and capacitive touch sensing, a touch information determiner configured to determine that touch information received from the idle sensor corresponds to electromagnetic touch information or capacitive touch information, an electromagnetic touch sensor for performing the electromagnetic touch sensing for a first period if the touch information is the electromagnetic touch information, and a capacitive touch sensor configured to perform the capacitive touch sensing for the first period, if the touch information is the capacitive touch information, based on the capacitive touch sensing, through the capacitive touch sensing after the first period.

In another aspect, there is provided a method for a display device performing capacitive and electromagnetic touch sensing, the method including: in an idle operation, alternating between capacitive touch sensing and electromagnetic touch sensing to determine whether touch information is received, the received touch information corresponding to capacitive touch information after capacitive touch sensing or electromagnetic touch information after electromagnetic touch sensing, in response to touch information being received, determining whether the received touch information corresponds to the capacitive touch information or electromagnetic touch information, if the input touch information is the electromagnetic touch information, performing an electromagnetic touch sensing operation, including: performing electromagnetic touch sensing for a first period, determining whether capacitive touch information is received by performing capacitive touch sensing, if capacitive touch information is received after the first period, subsequently performing capacitive touch sensing after the first period, if capacitive touch information is not received after the first period, determining whether electromagnetic touch information is received by performing electromagnetic touch sensing, if neither capacitive touch information nor electromagnetic touch information is received, performing the idle operation, if the input touch information is the capacitive touch information, performing a capacitive touch sensing operation, including: performing capacitive touch sensing for a first period, determining whether electromagnetic touch information is received by performing electromagnetic touch sensing, if electromagnetic touch information is received after the first period, subsequently performing electromagnetic touch sensing after the first period, if electromagnetic touch information is not received after the first period, determining whether capacitive touch information is received by performing capacitive touch sensing, if electromagnetic capacitive touch information nor capacitive touch information is received, performing the idle operation.

It is to be understood that both the foregoing general description and the following detailed description are examples and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention.

Figure 1:
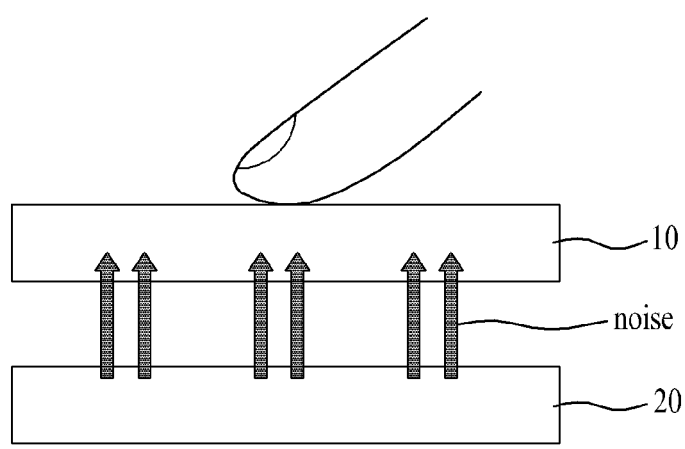
FIG. 1 is a schematic view of a display device with an input system according to the related art.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present invention, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

Figure 2:
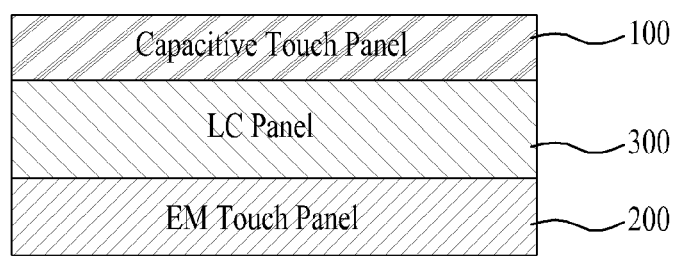
FIG. 2 is a cross sectional view illustrating a panel of a display device with an input system according to an embodiment.

FIG. 2 is a cross sectional view illustrating a panel of a display device with an input system according to an embodiment.

As shown in FIG. 2, a display device with an input system according to an embodiment may include a capacitive touch panel 100, a liquid crystal panel 300, and an electromagnetic touch panel (EM touch panel) 200.

First, the capacitive touch panel 100 may detect a location of touch by sensing a micro-current according to a change of capacitance between a sensing electrode and a finger. In the capacitive touch panel 100, a matrix may be formed by crossing X-axis electrode arrays and Y-axis electrode arrays. If touching a predetermined portion in the matrix, the predetermined portion of touch may be detected by sensing the X-axis and Y-axis coordinates with the change of capacitance in the matrix.

In one example, the input device of the capacitive touch panel 100 may be any part or parts of the human body which may cause the capacitance change with the sensing electrode, e.g., a finger.

According to an embodiment, the capacitive touch panel 100 may be, for example, an Add-on cell type touch panel or an On-cell type touch panel. In the Add-on cell type touch panel, the Y-axis electrode array, transparent substrate, and X-axis electrode array are sequentially deposited, or the Y-axis electrode array, transparent film, and X-axis electrode array are sequentially deposited; and then they are connected on the liquid crystal panel 300 with an adhesive. In the On-cell type touch panel, the Y-axis electrode array and X-axis electrode array are provided with an insulating layer interposed therebetween, and then they are connected on the liquid crystal panel 300 with an adhesive. Unlike the Add-on cell type touch panel, the On-cell type touch panel may not require an additional substrate or film between the Y-axis electrode array and X-axis electrode array.

Also, an In-cell type touch panel may be provided by forming the Y-axis electrode array and X-axis electrode array in the liquid crystal panel 300 comprising an upper color filter and lower thin film transistor (TFT). In case of the In-cell type touch panel, as an electrode ray for sensing the touch may be formed inside the liquid crystal panel 300, the capacitive touch panel may be included in the liquid crystal panel 300.

Then, the electromagnetic touch panel 200 may use the principle of electromotive force by Faraday's law magnetic induction. In the electromagnetic touch panel 200, the coordinates may be calculated by detecting an amount of current flowing in a unit coil according to the location, and the location of touch may be sensed by reading an electromagnetic value induced when a conductive film is touched with an input device, such as a stylus or pen.

In an example, a horizontal closed-loop coil, which may be supplied with a driving signal from the external, may be formed inside the electromagnetic touch panel 200, and the input device. e.g., a stylus or pen, may be provided with a resonance circuit. When it is touched, the resonance circuit may induce the electromotive force in the horizontal closed-loop coil, and the electromagnetic touch panel 200 may detect the induced electromotive force, to detect the location of the touch.

The liquid crystal panel 300 may be formed by interposing a liquid crystal layer between two glass substrates. On the lower substrate of the liquid crystal panel 300, there may be a plurality of data lines and gate lines, wherein the gate and data lines cross each other; a plurality of thin film transistors (TFTs) formed adjacent to crossing portions of the gate and data lines; a plurality of pixel electrodes for charging a data voltage in liquid crystal cells; and a storage capacitor for maintaining a voltage of the liquid crystal cell, wherein the storage capacitor is connected with the pixel electrode. By the crossing structure of the gate and data lines, the liquid crystal cells are arranged in a matrix configuration.

On the upper substrate of the liquid crystal panel 300, there may be a black matrix, a color filter, and a common electrode. In a vertical electric field type of driving mode, for example, Twisted Nematic (TN) mode and Vertical Alignment (VA) mode, the common electrode may be formed on the upper substrate. In a horizontal electric field type of driving mode, for example, In-Plane Switching (IPS) mode and Fringe Field Switching (FFS) mode, the common electrode, together with the pixel electrode, may be formed on the lower substrate.

Also, a column spacer may be formed to maintain a cell gap of liquid crystal cell between the lower and upper substrates.

Hereinafter, a structure of display device with a plurality of input systems according to an embodiment will be described with reference to FIG. 3.

Figure 3:
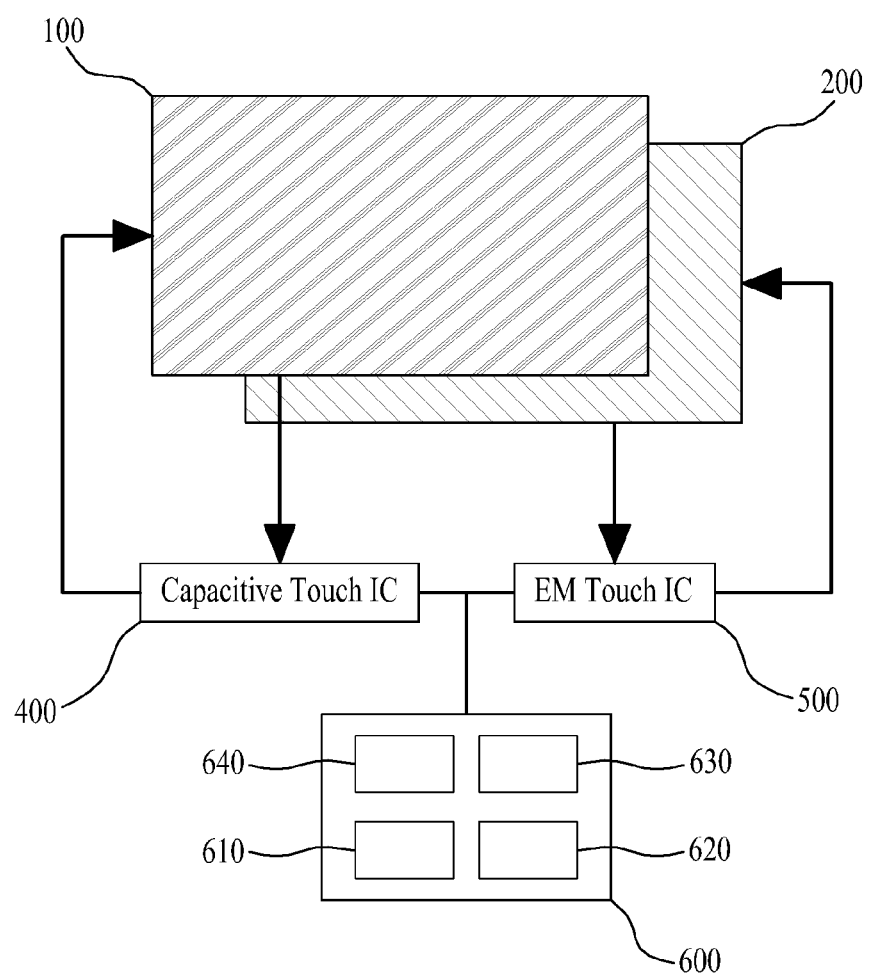
FIG. 3 illustrates a block diagram of a display device with input systems according to an embodiment.

FIG. 3 illustrates a block diagram of a display device with input systems according to an embodiment.

As shown in FIG. 3, the display device with input systems according to an embodiment may include a capacitive touch panel 100, an electromagnetic touch panel 200, a liquid crystal panel (not shown), a capacitive touch IC 400, an electromagnetic touch IC 500, and a controller 600.

The capacitive touch panel 100, electromagnetic touch panel 200, and liquid crystal panel (not shown) of the FIG. 3 example are similar to those of FIG. 2, and a detailed explanation for the same parts will be omitted, and only different parts will be described.

First, the capacitive touch IC 400 of the display device with input systems according to an embodiment may apply a touch scan signal for sensing the touch to the capacitive touch panel 100. Herein, the applied signal corresponds to a driving signal for driving a sensing electrode array.

The sensing electrode array may be driven by the touch scan signal, wherein the sensing electrode array may sense the touch location of capacitive type. At this time, the sensed touch location may be transferred to the capacitive touch IC 400, and may then be outputted through the display device.

Then, when an electromagnetic touch signal is inputted to the display device, the electromagnetic touch IC 500 of the display device with input systems according to an embodiment may apply a current for sensing the touch to the electromagnetic touch panel 200. At this time, the applied signal may generate an electromagnetic field in the closed-loop coil of electromagnetic type.

The electromagnetic field generated in the coil may be re-emitted to the input system using an input device, e.g., a stylus or pen, with the resonant circuit provided therein, whereby the current may be induced to the closed-loop coil, to sense the location of touch. In this case, the sensed touch location may be transferred to the electromagnetic touch IC 500, and may then be outputted through the display device.

The controller 600 of the display device with input systems according to an embodiment may include an idle sensor 610, a touch information determiner 620, an electromagnetic touch sensor 630, and a capacitive touch sensor 640. This controller 600 may be operated according to, e.g., an idle mode, an electromagnetic touch mode, or a capacitive touch mode.

The idle sensor 610 may alternately perform capacitive touch sensing and electromagnetic touch sensing. In other words, if there is no input of capacitive touch information and electromagnetic touch information in the display device, the idle sensor 610 may alternately perform the capacitive touch sensing and electromagnetic touch sensing to check input touch information and touch mode. If there is the input for the touch information in the display device, the input touch information may be transferred to the touch information determiner 620.

The touch information determiner 620 may determine that the input touch information transferred from the idle sensor 610 corresponds to the capacitive touch information or electromagnetic touch information. That is, in response to the touch information being transferred from the idle sensor 610 to the touch information determiner 620, the touch information determiner 620 may check that the input touch information corresponds to the capacitive touch information or electromagnetic touch information, and may determine whether to drive the electromagnetic touch sensor 630 or capacitive touch sensor 640 according to the checked touch information.

If the touch information is the electromagnetic touch information, the electromagnetic touch sensor 630 may perform the electromagnetic touch sensing for a first period. Each period may correspond to a period of time, e.g., a number of milliseconds or other time unit. In other words, if the touch information checked by the touch information determiner 620 corresponds to the electromagnetic touch information, the electromagnetic touch sensing may be performed for the first period, and the capacitive touch sensing may be performed in the capacitive touch sensor 640 after the first period, to check whether to have the capacitive touch input.

Based on the capacitive touch sensing, if the touch information is not the capacitive touch information, and the touch information inputted for a second period is not the electromagnetic touch information; the electromagnetic touch sensor 630 and capacitive touch sensor 640 may not be operated, and the idle sensor 610 may alternately perform the capacitive touch sensing and electromagnetic touch sensing, to check the touch information and touch mode to be inputted.

If the touch information is the capacitive touch information, the capacitive touch sensor 640 may perform the capacitive touch sensing for the first period. In other words, if the touch information checked by the touch information determiner 620 corresponds to the capacitive touch information, the capacitive touch sensing may be performed for the first period, and the electromagnetic touch sensing may be performed in the electromagnetic touch sensor 630 after the first period, to check whether to have the electromagnetic touch input.

Based on the electromagnetic touch sensing, if the touch information is not the electromagnetic touch information, and the touch information inputted for the second period is not the capacitive touch information; the electromagnetic touch sensor 630 and capacitive touch sensor 640 may not be operated, and the idle sensor 610 may alternately perform the capacitive touch sensing and electromagnetic touch sensing, to check the touch information and touch mode to be inputted.

Hereinafter, a method for driving the display device with input systems mentioned above will be described with reference to FIGS. 4 and 5.

Figure 4:
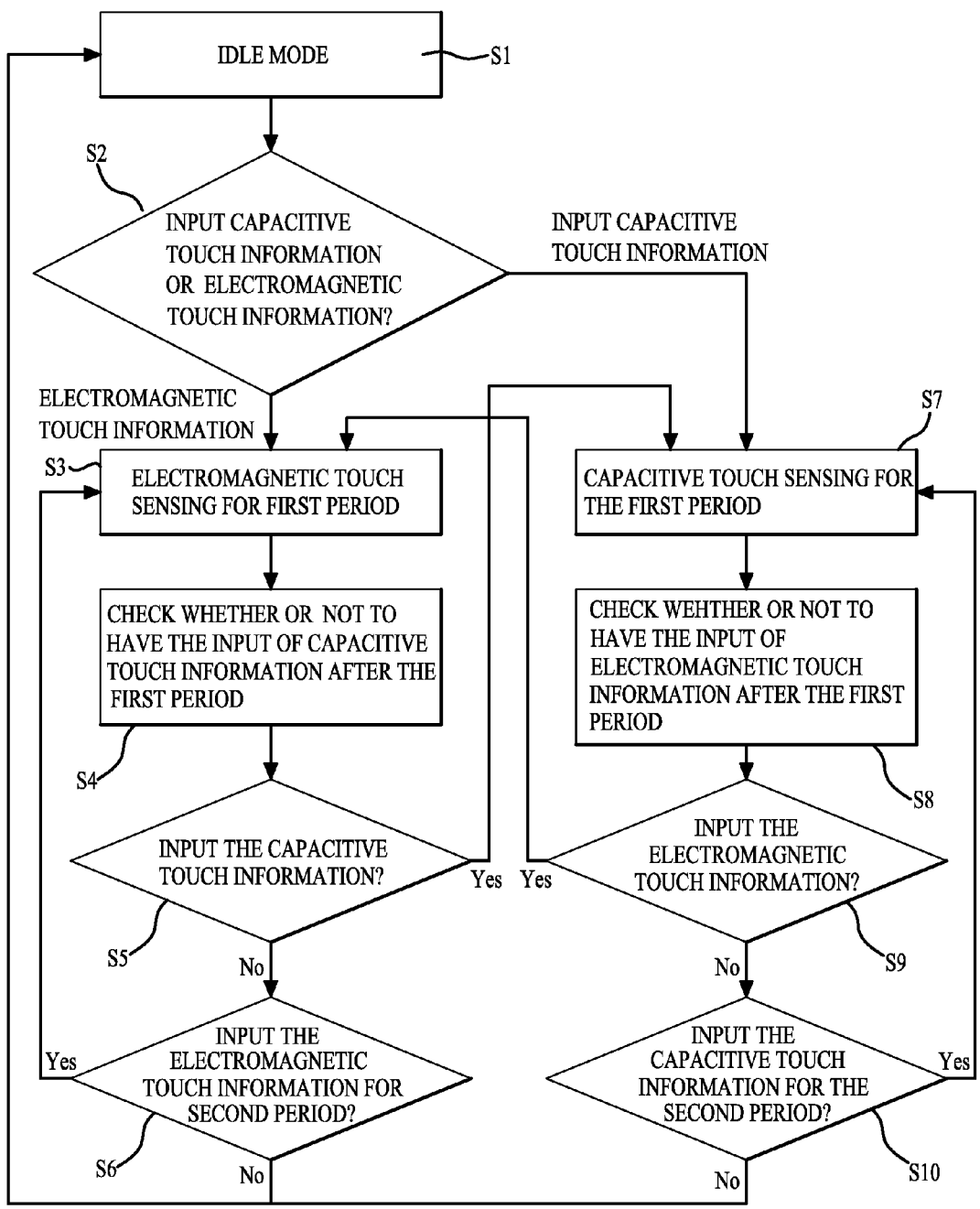
FIG. 4 is a flow chart illustrating a method for driving a display device with input systems according to an embodiment.

FIG. 4 is a flow chart illustrating a method for driving the display device with input systems according to an embodiment.

Figure 5A:
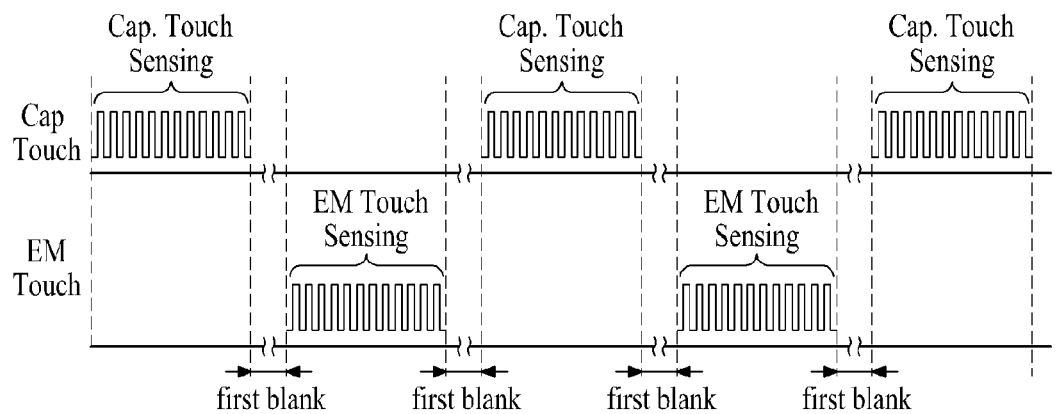
FIG. 5A illustrates a timing chart of an idle mode in a display device with input systems according to an embodiment.

FIG. 5A illustrates a timing chart of the idle mode in the display device with input systems according to an embodiment.

Figure 5B:
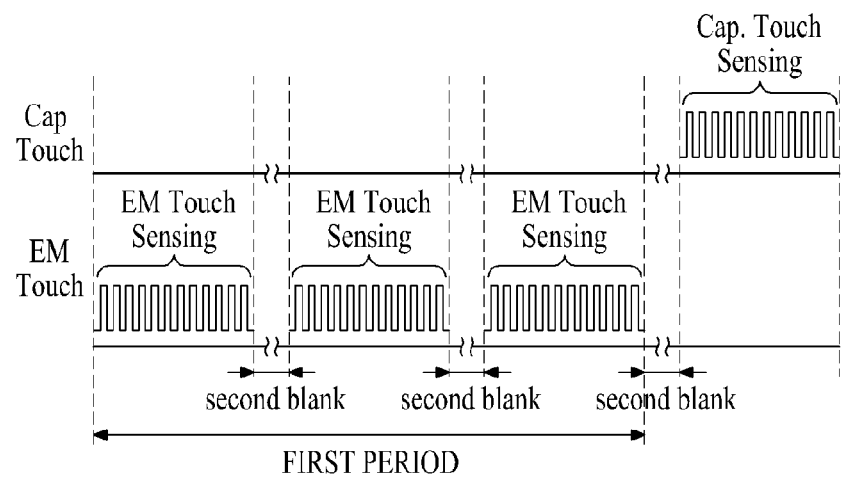
FIGS. 5B and 5C illustrate an electromagnetic touch sensing timing chart of a display device with input systems according to an embodiment.
Figure 5C:
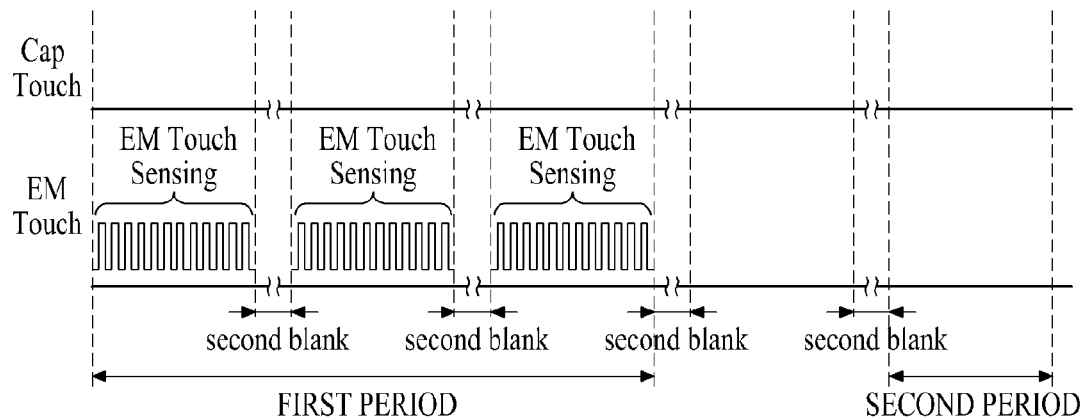

FIGS. 5B and 5C illustrate a timing chart of the electromagnetic touch sensing in the display device with input systems according to an embodiment.

Figure 5D:
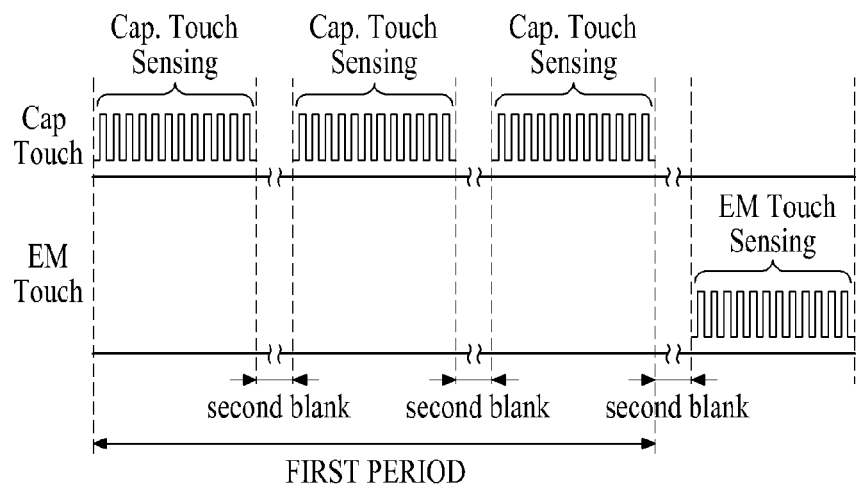
FIGS. 5D and 5E illustrate a capacitive touch sensing timing chart of a display device with input systems according to an embodiment.
Figure 5E:
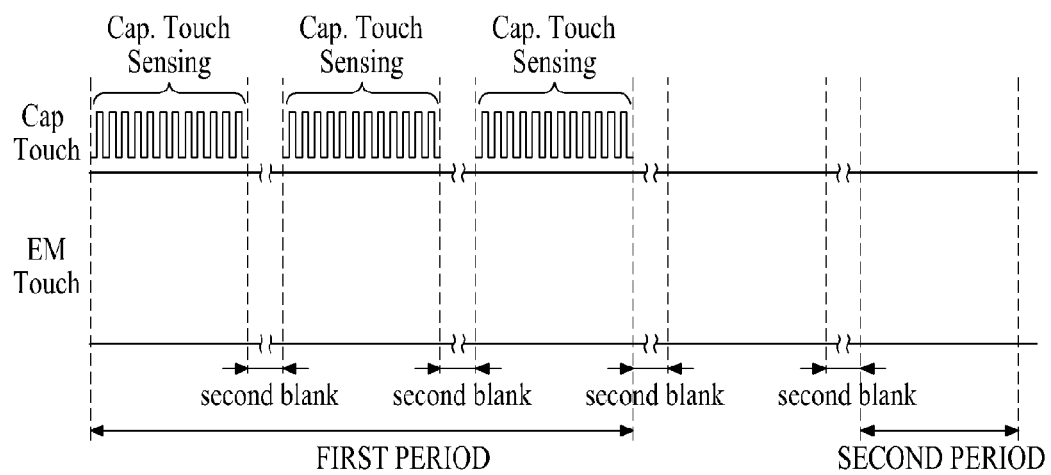

FIGS. 5D and 5E illustrate a timing chart of the capacitive touch sensing in the display device with input systems according to an embodiment.

As shown in FIG. 4, the method for driving the display device with input systems according to an embodiment may include operations of receiving the electromagnetic touch information or capacitive touch information by alternately performing the electromagnetic touch sensing and capacitive touch sensing; performing the electromagnetic touch sensing for the first period if the touch information is the electromagnetic touch information; performing the capacitive touch sensing after the first period; and performing the capacitive touch sensing for the first period if the touch information is the capacitive touch information based on the capacitive touch sensing.

Also, the method for driving the display device with input systems according to an embodiment may further include operations of receiving the electromagnetic touch information or capacitive touch information by alternately performing the electromagnetic touch sensing and capacitive touch sensing; performing the capacitive touch sensing for the first period if the touch information is the capacitive touch information; performing the electromagnetic touch sensing after the first period; and performing the electromagnetic touch sensing for the first period if the touch information is the electromagnetic touch information based on the electromagnetic touch sensing.

First, if the electromagnetic touch information and capacitive touch information are not inputted to the display device, the display device may perform an operation S1 for the idle mode.

For the idle mode, it may be checked whether the touch information corresponds to the capacitive touch information after the capacitive touch sensing, and also whether the touch information corresponds to the electromagnetic touch information after the electromagnetic touch sensing.

Referring to FIG. 5A, for the idle mode, the capacitive touch sensing and electromagnetic touch sensing may be alternately performed until the capacitive touch information or electromagnetic touch information is inputted.

In the FIG. 5A example, a power for the electromagnetic touch sensing may be stopped during the capacitive touch sensing, and a power for the capacitive touch sensing may be stopped during the electromagnetic touch sensing.

In the idle mode operation, there may be a first blank for stopping the capacitive touch sensing and electromagnetic touch sensing when the capacitive touch sensing is changed into the electromagnetic touch sensing or the electromagnetic touch sensing is changed into the capacitive touch sensing, reducing power consumption in the idle mode. The first blank may be a time period of about 50 ms-200 ms.

Then, if the touch information is inputted to the display device, an operation S2 for checking that the input touch information may correspond to the capacitive touch information or electromagnetic touch information is performed.

If the input touch information is the electromagnetic touch information, an operation S3 of the electromagnetic touch sensing may be performed for the first period. Meanwhile, if the input touch information is the capacitive touch information, an operation S7 for the capacitive touch sensing may be performed for the first period.

The power for the capacitive touch sensing may be stopped in the operation S3 of the electromagnetic touch sensing for the first period, and the power for the electromagnetic touch sensing may be stopped in the operation S7 of the capacitive touch sensing for the first period, to reduce power consumption.

In one example, the first period may indicate the period of the electromagnetic touch sensing shown in FIG. 5B, and may indicate the period of the capacitive touch sensing shown in FIG. 5D. The first period may be a time period of about 1 ms-60 ms.

In the operation S3 of the electromagnetic touch sensing for the first period, the touch sensing may be performed by a plurality of electromagnetic touch sensing signals which may be divided, wherein there may be a second blank between each of the electromagnetic touch sensing signals which may be divided, as shown in FIG. 5B. The second blank may be provided to consider the time of processing an electromagnetic touch sensing algorithm, which may be about 1 ms-60 ms.

In the operation S7 of the capacitive touch sensing for the first period, the touch sensing may be performed by a plurality of capacitive touch sensing signals which are divided, wherein there may be a second blank between each of the capacitive touch sensing signals which are divided, as shown in the FIG. 5D example. The second blank may be provided to consider the time of processing a capacitive touch sensing algorithm.

Then, if there is the electromagnetic touch sensing for the first period, an operation S4 for checking whether the capacitive touch information is inputted to a display panel may be performed through the capacitive touch sensing after the first period. If there is the capacitive touch sensing for the first period, an operation S8 for checking whether the electromagnetic touch information may be inputted to the display panel is performed through the electromagnetic touch sensing after the first period. The aforementioned steps of S4 and S8 are shown in the examples of FIGS. 5B and 5D.

In the operation S4 for checking whether the capacitive touch information is inputted to the display panel through the capacitive touch sensing after the first period, the power for the electromagnetic touch sensing may be stopped. In the operation S8 for checking whether the electromagnetic touch information is inputted to the display panel through the electromagnetic touch sensing after the first period, the power for the capacitive touch sensing may be stopped.

As shown in FIGS. 5B and 5D, there may be the second blank before the operation S4 for checking whether the capacitive touch information is inputted to the display panel through the capacitive touch sensing after the first period, and the operation S8 for checking whether the electromagnetic touch information is inputted to the display panel through the electromagnetic touch sensing after the first period, so that it may be possible to prevent noise which may occur when performing the capacitive touch sensing and electromagnetic touch sensing at the same time. The second blank may be about 1 ms-10 ms.

In an operation S5 for checking whether the capacitive touch information is inputted to the display panel through the capacitive touch sensing after the first period, if the capacitive touch information is inputted, the operation S7 of the capacitive touch sensing may be performed for the first period. Meanwhile, if the capacitive touch information is not inputted, an operation S6 for checking whether the electromagnetic touch information is inputted to the display panel for the second period may be performed.

If the electromagnetic touch information is inputted to the display panel for the second period, the operation S3 of the electromagnetic touch sensing may be performed for the first period. Meanwhile, if the electromagnetic touch information is not inputted, the operation S1 of the idle mode may be performed.

Also, the second period may be provided to check whether the electromagnetic touch information shown in FIG. 5C is inputted, wherein the second period may be about 1 ms-20 ms.

In an operation S9 for checking whether the electromagnetic touch information is inputted to the display panel through the electromagnetic touch sensing after the first period, if the electromagnetic touch information is inputted, the operation S3 of the electromagnetic touch sensing may be performed for the first period. Meanwhile, if the electromagnetic touch information is not inputted, an operation S10 for checking whether the capacitive touch information is inputted to the display panel for the second period may be performed.

If the capacitive touch information is inputted to the display panel for the second period, the operation S7 of the capacitive touch sensing may be performed for the first period. Meanwhile, if the capacitive touch information is not inputted, the operation S1 of the idle mode may be performed.

Also, the second period may be provided to check whether the capacitive touch information shown in FIG. 5E is inputted, wherein the second period may be about 1 ms-20 ms.

Accordingly, the display device with the input system according to an embodiment may have the following advantages.

According to an embodiment, the drivers for driving the capacitive touch panel 100 and electromagnetic touch panel 200 in the display device with the input system may be controlled by one controller, so that it may be possible to prevent touch malfunction by preventing noise of the electromagnetic touch panel 200 from flowing into the capacitive touch panel 100.

According to an embodiment, the capacitive touch panel 100 and electromagnetic touch panel 200 may be driven separately through the use of controller, to reduce the power consumption.

It will be apparent to those skilled in the art that various modifications and variations can be made in embodiments of the present invention without departing from the spirit or scope of the invention. For example, although examples of a stylus or pen are described, one skilled in the art would understand that other objects may be used. Thus, it is intended that the present invention cover the modifications and variations of this invention provided they come within the scope of the appended claims and their equivalents.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for driving a display device with an input system, comprising:
   in an idle mode, receiving touch information, comprising electromagnetic touch information or capacitive touch information, by alternately performing an electromagnetic touch sensing and capacitive touch sensing, the electromagnetic touch sensing and capacitive touch sensing being performed at different times;
   if the received touch information is the electromagnetic touch information, entering an electromagnetic touch sensing mode comprising:
      performing a plurality of electromagnetic touch sensings for a first period; and
      performing the capacitive touch sensing in a second period after the first period;
   if the received touch information is the capacitive touch information, entering a capacitive touch sensing mode comprising:
      performing a plurality of capacitive touch sensings for the first period; and
      performing the electromagnetic touch sensing in a second period after the first period; and
   returning to the idle mode after the second period.

2. The method of claim 1, further comprising:
   alternately performing the capacitive touch sensing and electromagnetic touch sensing in the idle mode if:
      the touch information is not the capacitive touch information; and
      the touch information received for the second period after the first period is not the electromagnetic touch information; and
   performing the electromagnetic touch sensing for a predetermined period after the second period if the touch information inputted for the second period is the electromagnetic touch information.

3. The method of claim 1, further comprising:
   if the touch information is the capacitive touch information, performing the capacitive touch sensing for the first period, and performing the electromagnetic touch sensing in the second period after the first period; and
   based on the electromagnetic touch sensing, if the touch information is the electromagnetic touch information, performing the electromagnetic touch sensing for the first period.

4. The method of claim 3, further comprising:
   alternately performing the capacitive touch sensing and electromagnetic touch sensing if the touch information is not the electromagnetic touch information based on the electromagnetic touch sensing, and the touch information inputted for the second period is not the capacitive touch information; and performing the capacitive touch sensing for a predetermined period after the second period if the touch information inputted for the second period is the capacitive touch information.

5. The method of claim 1, wherein, in alternately performing the capacitive touch sensing and electromagnetic touch sensing, there is a switching blank when the capacitive touch sensing is changed into the electromagnetic touch sensing or the electromagnetic touch sensing is changed into the capacitive touch sensing.

6. The method of claim 1, wherein:
performing the electromagnetic touch sensing for the first period is performed by a plurality of electromagnetic touch sensing signals which are divided; and
there is an interstitial blank between each of the electromagnetic touch sensing signals which are divided.

7. The method of claim 1, wherein:
performing the capacitive touch sensing for the first period is performed by a plurality of capacitive touch sensing signals which are divided; and
there is an interstitial blank between each of the capacitive touch sensing signals which are divided.

8. A display device with an input system, comprising:
an idle sensor configured to, in an idle mode, alternately perform an electromagnetic touch sensing and a capacitive touch sensing, the electromagnetic touch sensing and capacitive touch sensing being performed at different times;
a touch information determiner configured to determine that touch information received from the idle sensor corresponds to electromagnetic touch information or capacitive touch information;
an electromagnetic touch sensor configured to, if the received touch information is the electromagnetic touch information, enter an electromagnetic touch sensing mode comprising:
performing a plurality of electromagnetic touch sensings for a first period; and
performing the capacitive touch sensing in a second period after the first period;
a capacitive touch sensor configured to, if the received touch information is the capacitive touch information, entering a capacitive touch sensing mode comprising:
performing a plurality of capacitive touch sensings for the first period, if the touch information is the capacitive touch information; and
performing the electromagnetic touch sensing in a second period after the first period,
wherein, after the second period, the idle sensor is further configured to return to the idle mode.

9. The display device of claim 8, wherein:
the idle sensor is further configured to alternately perform the capacitive touch sensing and electromagnetic touch sensing in the idle mode if the touch information is not the capacitive touch information based on the capacitive touch sensing; and
the touch information received for the second period is not the electromagnetic touch information.

10. The display device of claim 8, wherein:
the electromagnetic touch sensor is further configured to perform the electromagnetic touch sensing for the first period if the touch information is not the capacitive touch information based on the capacitive touch sensing; and the touch information received for the second period is the electromagnetic touch information.

11. The display device of claim 8, wherein:
the capacitive touch sensor is further configured to perform the capacitive touch sensing for the first period if the touch information is the capacitive touch information; and
the electromagnetic touch sensor is further configured to perform the electromagnetic touch sensing for the first period, if the touch information is the electromagnetic touch information, based on the electromagnetic touch sensing, through the electromagnetic touch sensing in the second period after the first period.

12. The display device of claim 11, wherein:
the idle sensor is further configured to alternately perform the capacitive touch sensing and electromagnetic touch sensing if the touch information is not the electromagnetic touch information based on the electromagnetic touch sensing; and
the touch information inputted for the second period is not the capacitive touch information.

13. The display device of claim 11, wherein:
the capacitive touch sensor is further configured to perform the capacitive touch sensing for the first period if the touch information is not the electromagnetic touch information based on the electromagnetic touch sensing; and
the touch information inputted for the second period is the capacitive touch information.

14. A method for a display device performing capacitive and electromagnetic touch sensing, the method comprising:
in an idle operation, alternating between capacitive touch sensing and electromagnetic touch sensing to determine whether touch information is received, the received touch information corresponding to capacitive touch information after capacitive touch sensing or electromagnetic touch information after electromagnetic touch sensing;
in response to touch information being received, determining whether the received touch information corresponds to the capacitive touch information or electromagnetic touch information;
if the input touch information is the electromagnetic touch information, performing an electromagnetic touch sensing operation, comprising:
performing electromagnetic touch sensing for a first period;
determining whether capacitive touch information is received by performing capacitive touch sensing;
if capacitive touch information is received after the first period, subsequently performing capacitive touch sensing after the first period;
if capacitive touch information is not received after the first period, determining whether electromagnetic touch information is received by performing electromagnetic touch sensing; and
if neither capacitive touch information nor electromagnetic touch information is received, performing the idle operation;
if the input touch information is the capacitive touch information, performing a capacitive touch sensing operation, comprising:
performing capacitive touch sensing for a first period;
determining whether electromagnetic touch information is received by performing electromagnetic touch sensing;

if electromagnetic touch information is received after the first period, subsequently performing electromagnetic touch sensing after the first period;

if electromagnetic touch information is not received after the first period, determining whether capacitive touch information is received by performing capacitive touch sensing; and if neither electromagnetic capacitive touch information nor capacitive touch information is received, performing the idle operation.

15. The method of claim 14, wherein the subsequently performing capacitive touch sensing after the first period comprises performing the capacitive touch sensing operation.

16. The method of claim 14, wherein the subsequently performing electromagnetic touch sensing after the first period comprises performing the electromagnetic touch sensing operation.

* * * * *